(12) United States Patent
Hoegen (10) Patent No.: US 11,334,979 B2
(45) Date of Patent: May 17, 2022

(54) SYSTEM AND METHOD TO DETECT MACROBLOCKING IN IMAGES

(71) Applicant: iStreamPlanet Co., LLC, Las Vegas, NV (US)

(72) Inventor: Ian Arlo Hoegen, Port Orchard, WA (US)

(73) Assignee: iStreamPlanet Co., LLC, Las Vegas, NV (US)

( * ) Notice: Subject to any disclaimer, the term of this patent is extended or adjusted under 35 U.S.C. 154(b) by 28 days.

(21) Appl. No.: 16/870,589

(22) Filed: May 8, 2020

(65) Prior Publication Data

US 2021/0350515 A1    Nov. 11, 2021

(51) Int. Cl.
- *G06T 7/00*     (2017.01)
- *G06T 7/13*     (2017.01)
- *G06T 5/00*     (2006.01)
- *G06F 9/54*     (2006.01)
- *G06T 5/20*     (2006.01)

(52) U.S. Cl.
CPC .......... *G06T 7/0002* (2013.01); *G06F 9/542* (2013.01); *G06T 5/002* (2013.01); *G06T 5/009* (2013.01); *G06T 5/20* (2013.01); *G06T 7/13* (2017.01); *G06T 2207/10016* (2013.01)

(58) Field of Classification Search
CPC .......... G06T 5/002; G06T 5/009; G06T 5/20; G06T 7/0002; G06T 7/13; G06T 2207/10016; G06F 9/542
See application file for complete search history.

(56) References Cited

U.S. PATENT DOCUMENTS

| | | | | |
|---|---|---|---|---|
| 8,139,883 | B2 * | 3/2012 | Zhang | G06T 5/002 |
| | | | | 382/254 |
| 9,686,449 | B1 * | 6/2017 | Mogre | H04N 19/865 |
| 2009/0022416 | A1 * | 1/2009 | Kirenko | H04N 19/61 |
| | | | | 382/264 |
| 2013/0039420 | A1 * | 2/2013 | Liu | G06T 7/11 |
| | | | | 375/240.12 |
| 2017/0085884 | A1 * | 3/2017 | Kulkarni | H04N 19/154 |
| 2018/0203571 | A1 * | 7/2018 | Dayanandan | G06T 7/73 |

(Continued)

OTHER PUBLICATIONS

Bradski, G., "Canny Edge Detector," The Open CV Library, Dr. Dobb's Journal of Software Tools, 2000, downloaded from https://docs.opencv.org/2.4/doc/tutorials/imgproc/imgtrans/canny_detector/canny_detector.html on May 8, 2020, pp. 1-6.

(Continued)

*Primary Examiner* — Emily C Terrell
*Assistant Examiner* — Molly Delaney
(74) *Attorney, Agent, or Firm* — Nicholson De Vos Webster & Elliott LLP (57) ABSTRACT

A method is executed by an electronic device in a video streaming system including a macroblock detector. The method includes receiving a video stream from a video source, selecting a frame from the video stream, detecting edges in the frame of the video stream, generating straight lines from detected edges in the frame of the video stream, identifying squares in the straight lines in the frame with polygon approximation, and outputting an indication of a detected macroblock in the image in response to identifying at least one square with characteristics of a macroblock in the frame.

20 Claims, 8 Drawing Sheets

(56) References Cited

U.S. PATENT DOCUMENTS

2021/0104066 A1* 4/2021 Haeusler .................. G06T 7/73

OTHER PUBLICATIONS

Bradski, G., "Hough Line Transform," The Open CV Library, Dr. Dobb's Journal of Software Tools, 2000, downloaded from https://docs.opencv.org/2.4/doc/tutorials/imgproc/imgtrans/hough_lines/hough_lines.html on May 8, 2020, pp. 1-7.

Bradski, G., "Structural Analysis and Shape Descriptors," The Open CV Library, Dr. Dobb's Journal of Software Tools, 2000, downloaded from https://docs.opencv.org/2.4/modules/imgproc/doc/structural_analysis_and_shape_descriptors.html on May 8, 2020, pp. 1-18.

* cited by examiner

SYSTEM AND METHOD TO DETECT MACROBLOCKING IN IMAGES

TECHNICAL FIELD

The embodiments of the invention are related to the field of managing video and image content. More specifically, the embodiments of the invention relate to methods and systems for detecting macroblocks in images and video.

BACKGROUND ART

A compression artifact (or artefact) is a noticeable distortion of media such an audible error in audio media or visible error in images or videos. Artifacts are usually caused by the use of compression in the media. In particular, the use of lossy compression. Lossy compression, as the name implies, 'loses' some of the media's data in the compression process. While the compressed data is reduced in size to reduce storage and bandwidth utilization. Where a significant amount of data is lost in compression there can be a loss in quality of the media including noticeable changes to the media in the form of artifacts.

A common digital compression artifact is a discrete cosine transform (DCT) block. A common DCT compression algorithm used in JPEGs, MP3s, MPEGs, and similar encoding formats. DCT compression can cause several types of artifacts including ringing, contouring, posterizing, aliasing, and blockiness referred to as macroblocking. Other types of blockiness are also referred to as macroblocks. Other types of compression can introduce visible artefacts in pixel blocks and at block boundaries. These block boundaries can include transform block boundaries and prediction block boundaries and can correlate with macroblock boundaries. The term macroblocking is commonly used regardless of the artefact's cause. Other names are utilized for these artifacts include tiling, mosaicing, pixelating, quilting, and checkerboarding.

These other block type artifacts can be a result of the of block transform coding. In the case of video or images, the block transform is applied to a block of pixels, and the transform coefficients of each block are quantized. The lower the bit rate or higher the level of compression, the more coarsely the coefficients are represented and the more coefficients are quantized to zero. Some images have content that is compressed into blurry, low-resolution blocks. Neighboring blocks can be compressed in a way that leads to discontinuities at the block boundaries. These are most visible in uniform portions of an image, where there is not enough other detail to mask the artifacts.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

Video Streaming System in a Cloud Computing Environment

Figure 1A:
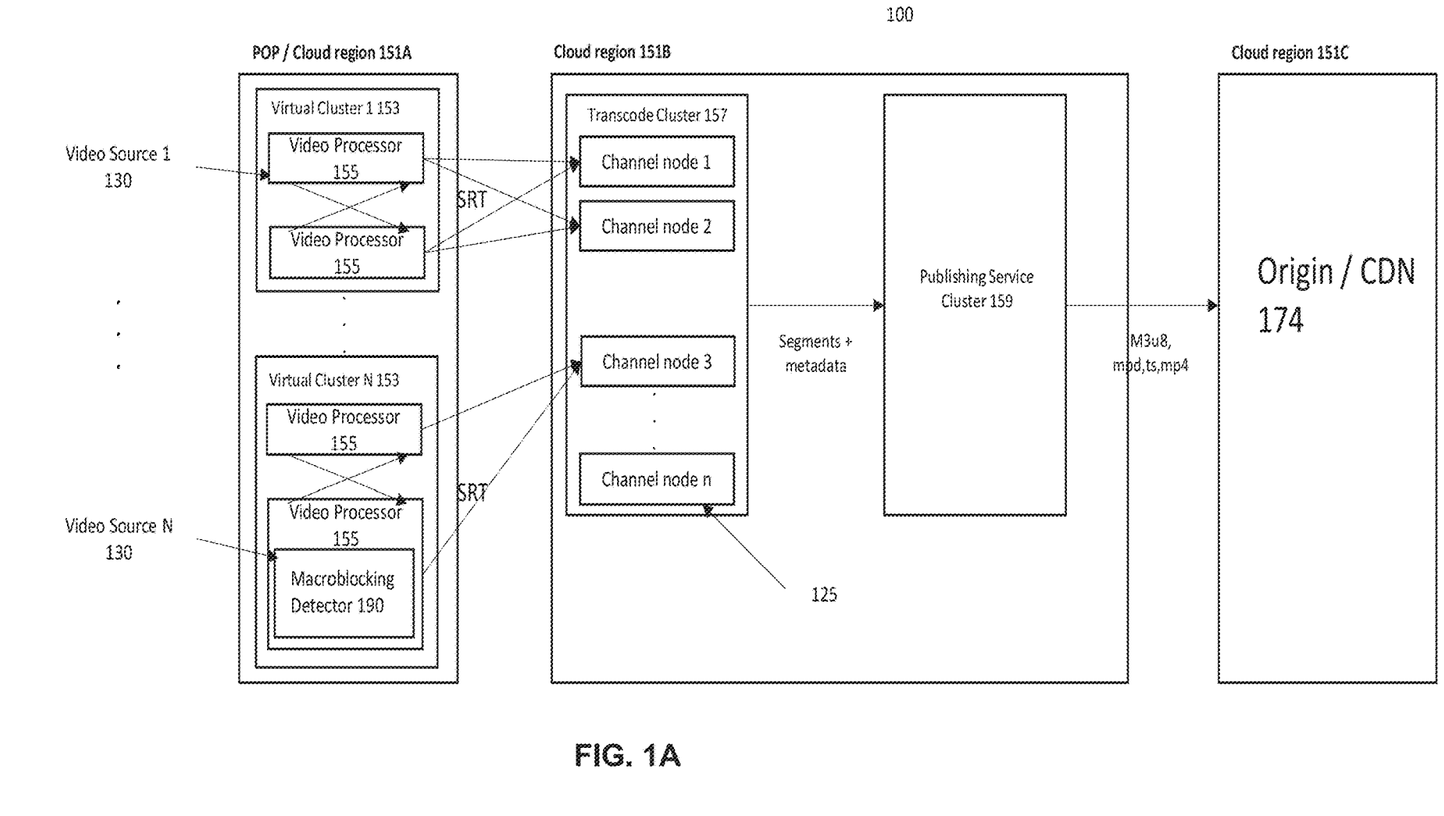
FIG. 1A is a diagram of one embodiment of a video streaming system supporting macroblocking detection.

FIG. 1A is a first embodiment of a video streaming system to support macroblocking detection in a cloud computing environment. The cloud computing environment can include a set of cloud regions 151A-C. A 'set,' as used herein can refer to any whole number of items including one item. These cloud regions can be different cloud computing environments provided by a same or different cloud computing provider. The cloud regions 151A-C can have different geographic locations and electronic device components and resources that are interconnected via communication networks with the other cloud regions 151A-C. Any number, configuration, and variety of cloud computing environments and regions 151A-C can be utilized to provide the video streaming system 100. In some embodiments, some of the components of the video streaming system 100 are located in a set of electronic devices referred to as a point of presence (POP). The POP can be provided by an internet service provider or similar interface through which external resources and electronic devices can interact with the cloud computing environment.

In an example embodiment, the video streaming system 100 includes a set of virtual clusters 153, a transcode cluster 157, and a publishing service cluster 159. Each cluster can be composed of any number and combination of electronic devices including servers, storage devices, networking devices and related devices that make up a cloud computing environment. The virtual clusters 153 can support a set of video processors 155. These video processors 155 can software components that process the incoming video sources 130 and are hosted by the virtual clusters 153. The video processors 155 can perform tasks associated with each video source 130 to process that video source and can be considered a unit of work or a worker in the video streaming system 100. Each video processor 155 can perform a single task or multiple tasks and can operate in conjunction with other video processors 155 to process the video sources 130. Any number of virtual clusters 153 can manage any number of video processors 155, which together can process any number of video sources 130. Video processors 155 can implement macroblock detection via macroblocking detectors 190 as well as perform any number of other video processing tasks. While a single video processor 155 is illustrated as providing a macroblock detector 190 any number of the video processors 155 can support this function.

The output of the video processors 155 can be provided to a transcode cluster 157. The transcode cluster 157 can further process the video sources to organize the video sources into a set of channels handled by associated channel nodes 125. The transcode cluster 157 and channel nodes 125 can combine video sources from the video processors 155 and encode the resulting video streams according to the configuration of the respective channels to be distributed to the publishing service cluster 159. A transcode cluster 157 is a set of electronic device resources including servers, storage devices, and networking devices that support any number of channel nodes 125. Similarly, the publishing service cluster is a set of electronic device resources including servers, storage devices, and networking devices that support any number of video streams that are to be published to a content distribution network 174 or in some cases returned to an origin server (e.g., a video source provider or other entity that may publish the video stream). In some embodiments, the transcode cluster 157 can output the video streams as segments and associated metadata. In some embodiments, the publishing service can format the video streams using video encoding formats M3u8, MPD, TS, MP4 and similar video encoding formats.

Figure 1B:
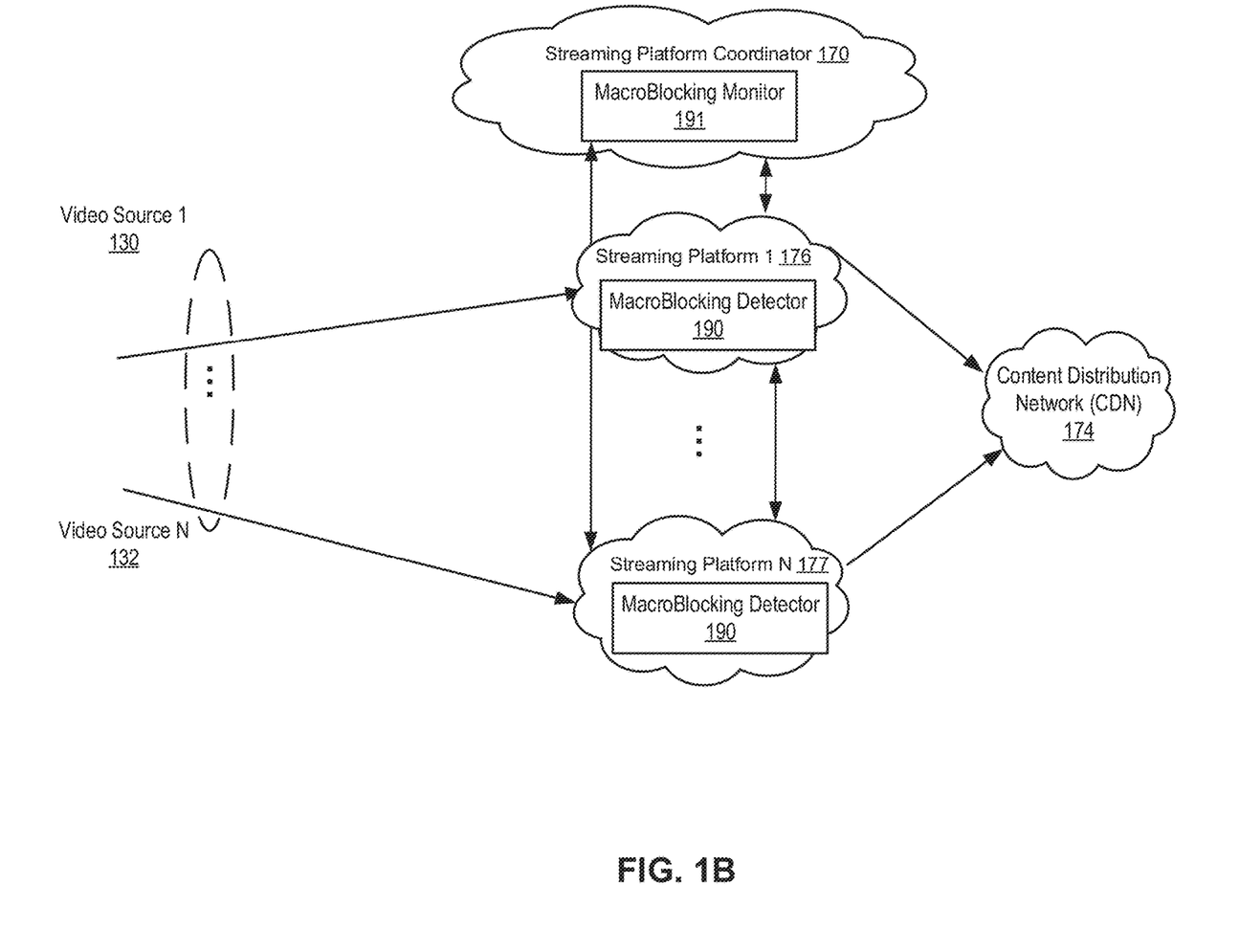
FIG. 1B is a diagram of another embodiment of a video streaming system containing multiple video streaming platforms.

FIG. 1B illustrates another embodiment of a video streaming system containing multiple video streaming platforms. A video streaming system 100 includes multiple video streaming platforms represented by a streaming platform 1 through a streaming platform N at references 176 and 177, a content distribution network 174, and a streaming platform coordinator 170.

The streaming platform coordinator 170 communicates with all the video streaming platforms including the streaming platforms 1 through N. The streaming platform coordinator 170 coordinates processing of the media contents routed to the various video streaming platforms. The processed media contents from the video sources are then published to the content distribution network 174.

It is to be noted that the various video streaming platforms and/or the streaming platform coordinator may be hosted by any one or more of various cloud computing providers. When two video streaming platforms are hosted by two different cloud computing providers, which generally offer computing resources with different characteristics, the two video streaming platforms are often referred to as heterogeneous video streaming platforms (versus homogenous video streaming platforms hosted by the same cloud computing providers). Cloud computing providers are building up their infrastructures at various geographic locations, and it is now practical for the video streaming system to utilize the cloud infrastructures concurrently at the various geographic locations and/or by different cloud computing providers.

Each video streaming platform may contain a macroblocking detector 190, which is illustrated as a macroblocking detector in streaming platforms 1-N respectively. The macroblocking detector 190 is to monitor for macroblocks in media that can be in the media as it is received from the video sources, caused by processing media workflows created for video sources in a video streaming platform as discussed in more details herein below, or in similar processing of the received media (i.e., video) as it is received from the video sources, handled by the streaming platforms, and forwarded via the content distribution network 174.

In some embodiments, the streaming platform coordinator 170 may contain a macroblocking monitor 191 that similarly monitors for macroblocking detected and reported by macroblocking detectors 190 from processing media workflows in all video streaming platforms the streaming platform coordinator 170 interacts with, and the streaming platform coordinator 170 may manage or coordinate notifying a feedback mechanism or corrective components to address the macroblocking. The macroblocking monitor 191 can also coordinate resources related to the macroblocking detectors 190 at different video streaming platforms. Where a feedback mechanism is available in the system 100 the macroblocking monitor 191 or macroblocking detectors 190 can send notification of detected macroblocks to the feedback mechanism that may report the detected macroblocks to a video source or administrator. In cases where corrective components are available in the system 100, then the reporting of the macroblocks can trigger further processing to correct or ameliorate the macroblocking issues. The reporting of the macroblocks can indicate a number of macroblocks detected, identifying information about the media or video source and frames in which the macroblocks occur as well as other relevant information for correcting the macroblocks in the system 100.

Video Streaming Platform in a Cloud Computing Environment

A set of video streaming platforms is a main component of a video streaming system 100 as illustrated in FIG. 1B. The video streaming platforms 176 and the video streaming system 100 can perform any number of operations to process any number of input video sources 130-132 and output via a content distribution network 174 to reach any number of consuming devices and software applications. The operations performed on the video sources 130-132 can include the macroblocking detection implemented by microblocking detectors 190. Each streaming platform 176 can execute any number of macroblocking detectors 190 using workers or similar mechanism as described further herein. The macroblocking detectors 190 can operate on a per streaming platform 176, per video source 130-132 or similar basis.

Figure 2:
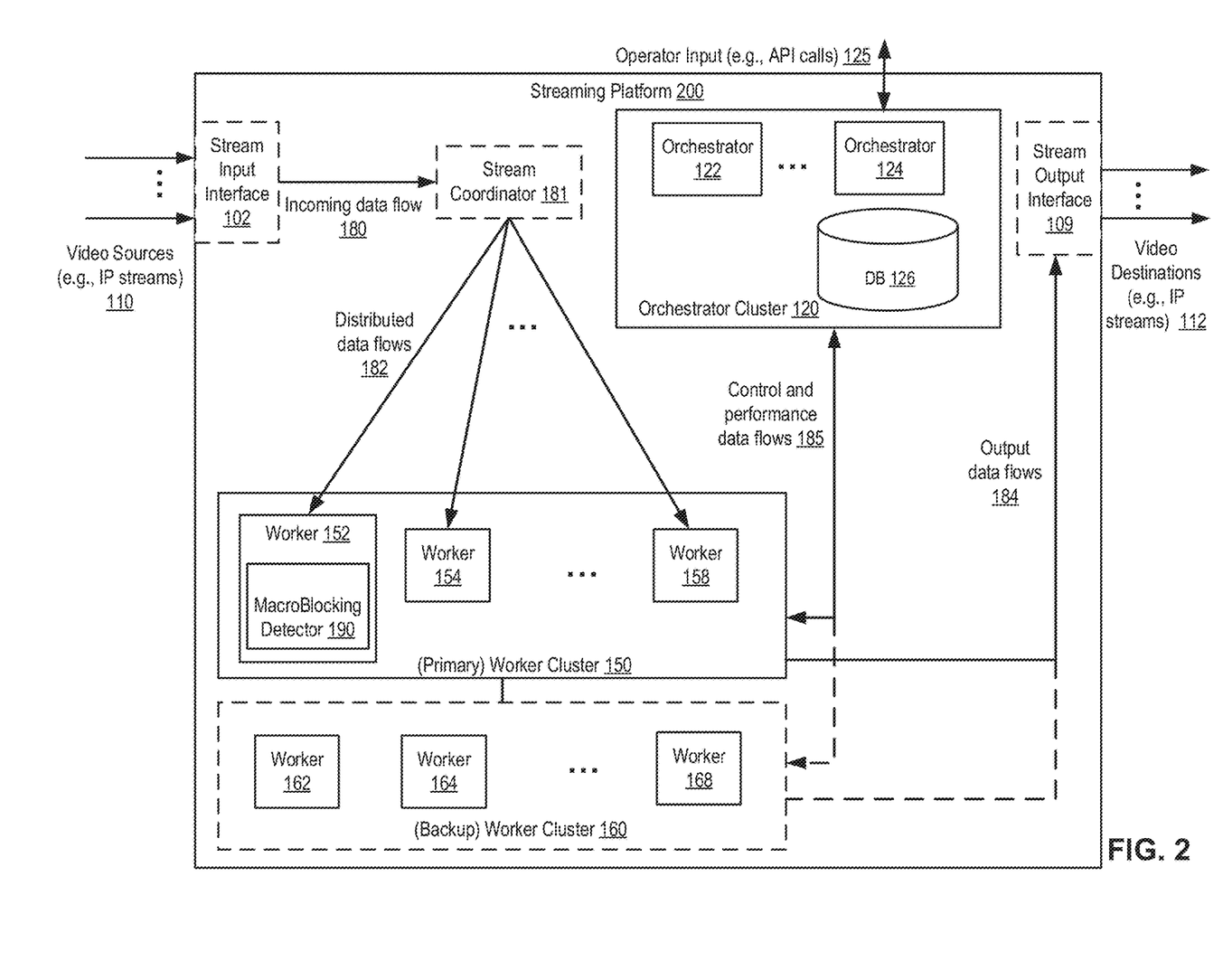
FIG. 2 is a diagram of one embodiment of one of the video streaming platforms in the video streaming system.

The architecture of the video streaming platform and its operations are discussed in more detailed discussion with relation to the additional figures. FIG. 2 illustrates a video streaming platform in a cloud computing environment according to one embodiment of the invention. A streaming platform 200 (also referred to as a video streaming platform, and the two terms are used interchangeably in the specification) is a computing system, and it contains one or more machines including one or more server computers, gateways, routers, or other computing/networking electronic devices. A streaming platform coordinator (such as the streaming platform coordinator 170) manages operations of the streaming platform 200, yet some or all of the electronic devices within the streaming platform 200 may be owned by a third party such as a cloud computing provider discussed herein above. That is, a cloud computing environment operated by a cloud computing provider may host the streaming platform 200.

The streaming platform 200 receives its data flow input at a stream input interface 102 in one embodiment. For example, video sources to be processed by the streaming platform 200 enters through the stream input interface 102. A video source contains one or more Internet Packet (IP) packet streams in one embodiment. The IP packet streams may contain one or more live video feeds. A live video feed may be video of a live event or live performance, or may be video of a prerecorded event being played back according to a schedule. The live video feed may be a video broadcasted over cable, satellite, or over-the-air. It is to be noted that the terms "video source," "video stream," and "video feed," as used interchangeably herein, refer to the video and corresponding audio of the particular recorded event (e.g., TV show, live performance, sporting event, etc.), but also may include video only. Additionally, the video source (sometimes referred to as the video and audio streams) of the streaming platform 200 may contain only audio (e.g., an Internet radio stream). The video source may be a webcast of a television broadcast, such as of a sporting event, a live or recorded performance, a live or recorded news report, or the like. A live event may also have pre-recorded content intermingled with live media content, such as advertisements, which are played in between the live telecast. It should be noted that the embodiments of the invention described herein may also be used for streaming video-on-demand (VOD).

A video source may be "pushed" to the streaming platform 200 where the video source is IP packet streams such as the Moving Picture Experts Group (MPEG)-transport streams (MPEG-TS). The IP packet streams logically flow to streaming platform 200 from an external source thus the video source is referred to as being pushed to the streaming platform 200.

A video source may also be "pulled" by a processing unit (referred to as a worker) of streaming platform 200, where the worker runs one or more processing tasks. The worker may initiate a Transmission Control Protocol (TCP) connection to an external uniform resource identifier (URI) (an external uniform resource locator (URL) or an external uniform resource name (URN)), and after performing a protocol handshake, cause inbound IP packet streams to flow directly into the worker for one or more processing tasks without being processed by the optional stream input interface 102 or the stream coordinator 181. The pull of video feeds may be implemented through the real time messaging protocol (RTMP), where the processing task includes a RTMP capture task.

The stream input interface 102 is a logical input point for data flows into the streaming platform 200. It may not be present as a physical entity of the streaming platform 200 in one embodiment. From the stream input interface 102, a video source becomes an incoming data flow 180. The incoming data flow contains data of one or more video and audio streams. In one embodiment, the incoming data flow is transmitted in user datagram protocol (UDP) packets. The incoming data flow 180 may optionally go to a stream coordinator 181, which converts unicast data flows into distributed data flows 182.

Workers may be organized as worker clusters in a streaming platform. In the streaming platform 200, workers 152-158 are in a primary worker cluster 150, which contains workers actively working on processing tasks. Workers 162-168 are in a backup worker cluster 160, which contains workers remains standby thus provides redundancy and robustness for the streaming platform 200. Workers perform tasks through coordination with one or more orchestrators, which may form an orchestrator cluster such as an orchestrator cluster 120. The orchestrator cluster 120 interacts with worker clusters 150-160 through one or more control flows, included in control and performance data flows 185.

The orchestrator cluster 120 contains orchestrators 122-124 and an orchestrator database 126 that stores data for operations of the orchestrators. The orchestrators may form load-balanced group within an orchestrator cluster, and the orchestrator cluster may be paired with another separately located orchestrator cluster (e.g., the other orchestrator cluster being at a different rack or even a different geographic location) for redundancy and robustness purpose too. An orchestrator creates a workflow for a video source in the streaming platform 200, and it may also host services responsible for work scheduling and overall system health monitoring and management. In some embodiments, the orchestrator database 126 is optional. For example, each of the orchestrators 122-124 contain a distributed in-memory storage to store information for the operations by the orchestrator 122-124 and/or orchestrator cluster 120. In alternative, a database outside of the orchestrator cluster 120 may store the information for the operations by the orchestrator 122-124 and/or orchestrator cluster 120 (e.g., the database may be stored in a streaming platform coordinator such as the streaming platform coordinator 170 in FIG. 1).

Workers are coupled to one or more orchestrators, and the workers execute processing tasks on the distributed data flows 182. The data flows are processed and the workers produce output data flows 184. The output data flows 184 may optionally transmit to a stream output interface 109, a logical output point for the data flows going out of the streaming platform 200. It is to be noted that both the stream input interface 102 and the stream output interface 109 may be integrated into parts of worker functions and they may not be individual physical units of the streaming platform 200.

Output data flows goes to video destinations 112, which contains one or more IP streams in one embodiment. The output data flows may be delivered to an ingest point of a content delivery network (CDN). A CDN is a system of computers networked together across the Internet that cooperates transparently to deliver content, and may include, for example, one or more origin content servers, web servers, cache servers, edge servers, etc. The output data flows may also be delivered to a video playback device directly. A single output data flow may be delivered to multiple destinations through multicast.

It is to be noted that both workers and orchestrators of the streaming platform may be implemented on cloud-hosted virtual machines (VMs). The VMs are parts of the cloud computing environment hosting the streaming platform and they reside on computing systems of the cloud computing environment. These computing systems are referred to as hosts of the workers and orchestrators in the streaming platform 200. The hosts are managed by a cloud provider and they may concurrently host applications other than the video streaming platform. Thus, the worker hosts are not dedicated to the streaming platform and they are allocated to the streaming platform as needed and according to coordination of the orchestrators.

It is to be noted that in some embodiments orchestrator cluster 120 also contains a macroblocking monitor 191 or macroblocking detector 190. The macroblocking monitor 191 monitors the macroblocking detectors 190 in the streaming platform 200 through collecting performance data from the workers (e.g., the performance data collected along with the control flows, as the control and performance data flows illustrated at reference 185) and determines if any macroblocking is detected. When a macroblock is detected, the macroblocking detector 191 or macroblocking detector 190 can initiate mitigation and/or provides notification (e.g., to an operator of the streaming platform 200 and/or to a streaming platform coordinator). While the macroblocking monitor 191 is illustrated a standalone entity of the orchestrator cluster 120, the macroblocking monitor 191 may be integrated with other entities such as orchestrators 122-124. Additionally, a portion of the macroblocking monitor 191 may be within the orchestrator database 126 in one embodiment.

For the streaming platform 200, a graph of tasks is used to process a media workflow. A media workflow, also referred to as a workflow or channel (the terms workflow and channel are used interchangeably in the specification), represents a processing work flow that transforms an individual incoming data stream (e.g., a video source) into its configured output data stream(s), and it contains all of the necessary information used to create a directed task graph and to calculate the correct parameters for each task required in order to correctly transform the incoming data stream into the specified output data stream(s). During workflow creation, the orchestrator is responsible for compiling a channel definition (e.g., using the JavaScript Objection Notation (JSON) format) into a directed graph of tasks (referred to as a task graph) with associated configuration data and for assigning those tasks into logical groups (referred to as task groups) based on estimated resource requirements. The directed graph of tasks is a directed acyclic graph (DAG) of tasks for processing the video source. A DAG is a directed graph with no directed cycles. The directed graph is formed by a collection of nodes (also referred to as vertices) and directed edges, each edge connecting one node to another, such that there is no way to start at a node and follow a sequence of edges that eventually loops back to the node. Each node of the task graph represents a processing task, and each edge represents a data flow across two processing tasks and corresponding input and output of each processing task.

Overall, the streaming platform 200 ingests video sources, transcodes, and transforms the video sources into desired one or more formats for publication and then outputs the resulting video data. The video streaming platform is a distributed architecture using cloud resources, and it is a flexible, scalable, and efficient platform for video processing. The streaming platform 200 receives operator input 125 to the orchestrator cluster 120. The operational input may be from the streaming platform coordinator 170. The communication between the streaming platform coordinator 170 and the streaming platform 200 may include sending requests/confirmations from the streaming platform coordinator and updates/responds from the streaming platform 200. The operator input 125 may also from an operator separately from the streaming platform coordinator 170. The operator input may be in the form of API calls. One of the requests from the streaming platform coordinator is a request to create a workflow for a video source in the streaming platform 200. The request (may be referred to as a channel creation request) may contain a variety of parameters describing the video source and the expected operations. For example, the request may contain at least one of the following:

Mandatory parameters describing the type of the video source (e.g., MPEG-2, MPEG-4, H.265, and etc.), and location of the video source (e.g., ingest protocol, IP address, URI, and etc.).

Indication of whether and how to enable subtitle processing and/or enable advertisement insertion processing for the video source.

The desired video and audio transcoding operations (e.g., how many audio/video layers, the desired output characteristics for each such as video frame size/rate and bitrate, the relevant portion of the incoming data flow to use if applicable) for the video source.

The desired contention protection operations for the published output (e.g., Microsoft© PlayReady, Adobe© Access DRM, AES-128 Encryption for HTTP live streaming, etc.).

The desired publishing operations to output (e.g., which output format(s) such as HTTP live streaming (HLS), HTTP dynamic streaming (HDS), RTMP, or Microsoft© smooth streaming) to publish, and the destination(s) to send each output format.

Based on the request, the orchestrator cluster 120 creates media workflows for video sources 110, utilizing directed graphs of tasks, and each of the so called task graphs is a directed acyclic graph (DAG) of tasks for processing the video source. Each task graph contains tasks to be performed by a worker of the streaming platform 200. The tasks are then assigned to workers for execution, and the results are included in the output data flows 184.

A media workflow contains a large number of tasks to be performed by a video streaming platform. An outside-in network management approach (e.g., SNMP), where the network management system can only collect performance data at a worker level, cannot provide efficient performance monitoring of the processing of the media workflow within the video streaming platform, let alone mitigate any macroblock detected with regard to the processing blocks in a timely fashion. For example, the worker is often implemented as a virtual machine in the video streaming platform, and using SNMP, an operator of the video streaming platform may determine a percentage of central processing unit (CPU) usage. The CPU usage may be too high (90%) for the worker, but without knowing the details of the processing of the media workflow, SNMP cannot determine the reason of the high CPU (e.g., it can be caused by malfunctioning of decoder, frame rate conversion, scaling, and/or video encoders), thus cannot provide effective mitigation.

Operations of Macroblock Detection in a Video Streaming Platform

Figure 3A:
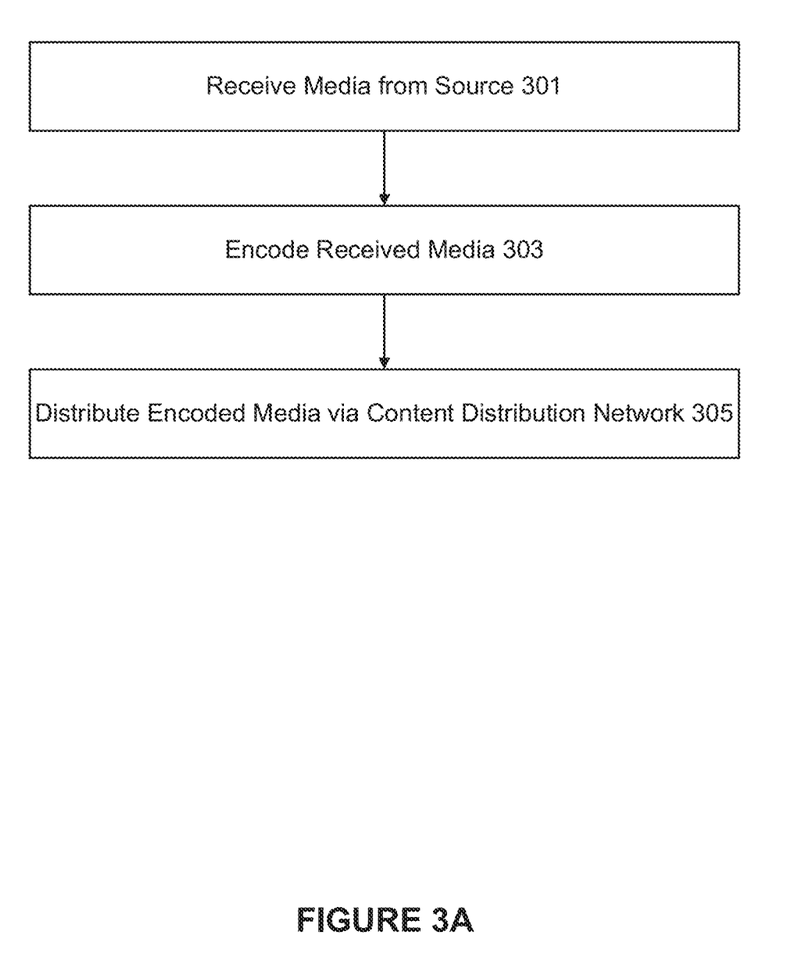
FIG. 3A is a flowchart of one embodiment of a process for streaming media content.

FIG. 3A is a flowchart of one embodiment of a process for streaming media content. The process is illustrated at a high level to represent the overall function of the video streaming system 100. The video streaming system receives media (e.g., a video source or stream) from a content producer or similar video source (Block 301). The media received from content producers can be encoded in any format and can have any size or organization. In some cases, the media can be formatted to satisfy legal agreements between content producers and content distributors who stream the media on their platform (e.g., via a content delivery network (CDN)) and/or to meet the technical requirements of the distributors who stream the media on their platform.

The video streaming system can encode (i.e., re-encode) the received media (Block 303). The encoding of the media can be done to format the media to meet the legal and/or technical requirements of the distributor and the platform of the distributor (e.g., the CDN of the distributor). In addition to reformatting the media, the video streaming system can also process the received media to improve the transmission, quality, or other characteristics of the received media. In some embodiments, the video streaming system can compress the received content to reduce the size and bandwidth requirements of the received media. The compression can be done to improve the resource utilization of the video streaming system or the CDN. The CDN can in some cases specify the format and characteristics (e.g., the compression rate) of the media to be handled by the CDN. The embodiments provide a system and method to detect macroblocking in the media received from the content producers (e.g., in the input video sources) and/or detect macroblocking in the media after encoding by the video streaming system. After the processing of the video streaming system, the output media can be provided to the CDN for distribution to a set of users or subscribers to the media (Block 305).

Figure 3B:
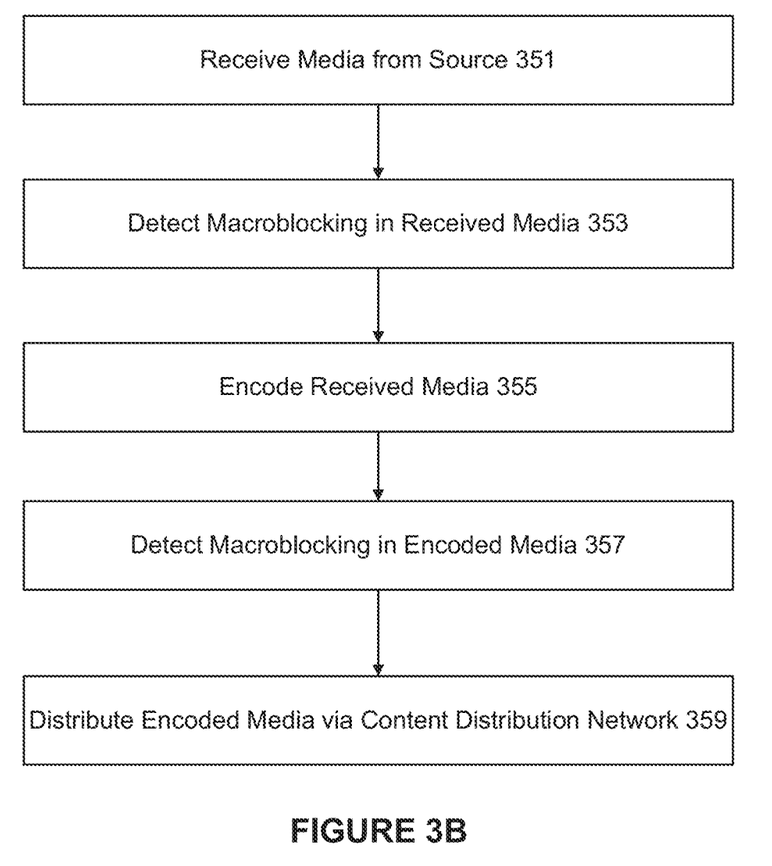
FIG. 3B is a flowchart of one embodiment of a process for streaming media content with macroblocking detection.

FIG. 3B is a flowchart of one embodiment of a process for streaming media content with macroblocking detection. The illustrated process provides an example process for a video streaming system that includes macroblocking detection. The process is illustrated at a high level to represent the overall function of the video streaming system 100. The video streaming system receives media (e.g., a video source or stream) from a content producer or similar video source (Block 351). The media received from content producers can be encoded in any format and can have any size or organization. In some cases, the media can be formatted to satisfy legal agreements between content producers and content distributors who stream the media on their platform (e.g., via a content delivery network (CDN)) and/or to meet the technical requirements of the distributors who stream the media on their platform.

In some embodiments, the received media can be analyzed to detect macroblocks within the received media (Block 353). The macroblock detection can be carried out on the received media prior to other processing or can be carried out after other processing of the received media. Thus, the order of the macroblock detection relative to other aspects of the process is illustrated by way of example and not limitation. Where macroblocks are detected in the input media (e.g., an input video source), then a content provider, video streaming system administrator, corrective component, or other entity can be notified of the detected macroblocks. The detection of the macroblocks can be on a frame by frame basis where the media is video. The detection of macroblocks can include identifying a number and location of the macroblocks within the received media.

The video streaming system can encode (i.e., re-encode) the received media (Block 355). The encoding of the media can be done to format the media to meet the legal and/or technical requirements of the distributor and the platform of the distributor (e.g., the CDN of the distributor). In addition to reformatting the media, the video streaming system can also process the received media to improve the transmission, quality, or other characteristics of the received media. In some embodiments, the video streaming system can compress the received content to reduce the size and bandwidth requirements of the received media. The compression can be done to improve the resource utilization of the video streaming system or the CDN. However, the compression in some cases can introduce artifacts in the media such as macroblocks. The CDN can in some cases specify the format and characteristics (e.g., the compression rate) of the media to be handled by the CDN. In some embodiments, the video streaming system can perform macroblocking detection after the media encoding (Block 357). Where macroblocks are detected (e.g., in the frames of a video stream), then information related to the macroblocks can be provided to a feedback mechanism, corrective component, and/or similar component of the video streaming system. The information can include identifying a number and location (e.g., specific frames in a video stream) where the macroblocks are detected. The notification can be provided to trigger administrative review, logging, corrective processes, or similar actions. After the processing of the video streaming system, the output media can be provided to the CDN for distribution to a set of users or subscribers to the media (Block 359).

Figure 4:
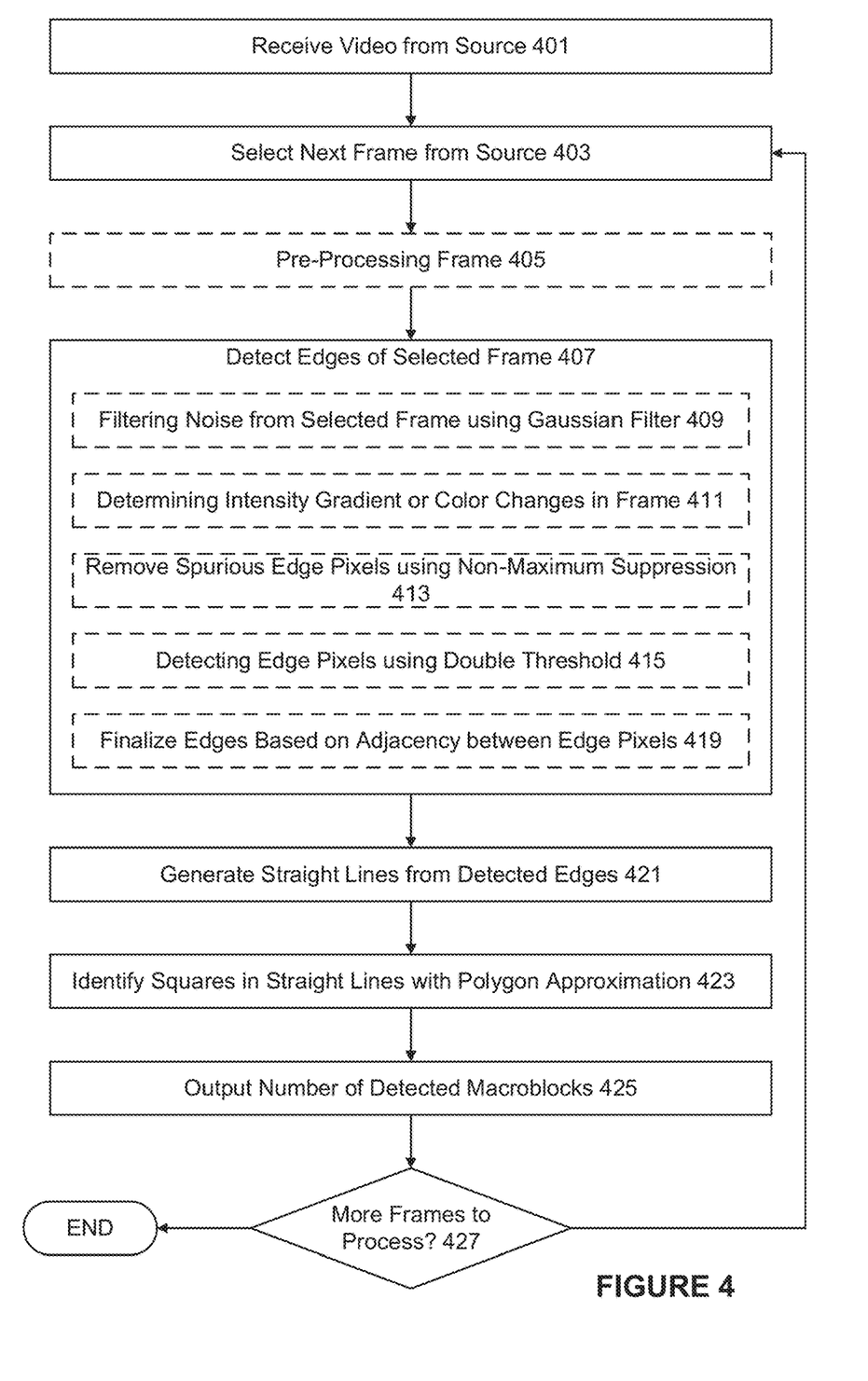
FIG. 4 is a flowchart of one embodiment of a process for detecting macroblocking in media content and encoding the media content.

FIG. 4 is a flowchart of one embodiment of a process for detecting macroblocking in media content and encoding the media content. The method to detect macroblocking can be implemented at various stages of the video streaming system processes as described herein. The macroblocking process can be implemented as a macroblocking detector and managed by a macroblocking monitor. The received media content where a stream of content can be broken down into individual content items. The example of the media being a video stream is provided herein by way of example and not limitation. One skilled in the art would understand that the principles, structures, and processes described herein with relation to video processing is also applicable to other types of media content. Further video content can encompass any format or range of formats of video including augmented reality based content, three dimensional content streams and similar media.

In the example, a video stream is received from a video source to be processed by the video streaming system (Block 401). The received video stream is broken down into individual frames and processed sequentially, in parallel, batches or similarly processed. A sequential processing is illustrated by way of example for clarity and conciseness. The next frame in the video stream is selected to be processed (Block 403). A frame of the video stream is an image composed of a matrix of pixels in time series with other frames to form the video. In some cases, a pre-processing of the frame is performed to enhance the image for macroblocking identification (Block 405). In some implementations, the frame is pre-processed by adjusting (e.g., increasing) image brightness, adjusting contrast, by converting the frame to greyscale, and/or similarly altered to facilitate edge detection and macroblock identification.

The macroblocking detection process then detects edges of the current frame (Block 407). Edges are sets of pixels that separate different areas or features within the frame. The edges of a selected frame are detected using an edge detection algorithm. Any edge detection algorithm or process can be utilized. In one embodiment, the Canny method for edge detection is utilized. As part of the edge detection process, the embodiments can filter out noise from the selected frame using a filter (e.g., a Gaussian filter) (Block 409). The edge detection process can further examine pixels in the frame to identify intensity gradient (or color) changes in the frame (Block 411). Changes in color or intensity gradient can correlate with edges in the frame. Spurious edges in the frame a non-maximum suppression can be applied to remove pixels that that should not be considered an edge. A non-maximum suppression is an edge thinning technique that can reduce all but the sharpest or most defined edges in the frame (Block 413).

A set of candidate edge pixels can be further identified by using a double threshold process (Block 415). The application of the double threshold process can encompass consideration of pixel adjacencies to identify edges (Block 419). For example, pixels that have intensity gradients above an upper threshold value are designated as an edge pixel. Pixels having intensity gradients between an upper threshold value and a lower threshold value are considered to be an edge pixel if they are in the neighborhood (e.g., connected to) of an edge pixel.

A set of edges are then defined for the frame (e.g., Canny edges), which can be filtered to identify squares by generating or identifying straight lines from the detected edges (Block 421). The straight lines (e.g., Hough lines determined from the Canny edges) can be identified including their intersections throughout the frame. For example, Hough lines can be generated by filtering pre-processed Canny edges for lines that are either parallel or perpendicular to the horizon of the frame. A line can be detected by finding the number of intersections between curves. A threshold is defined for the minimum number of intersections needed to detect a line. If the number of intersections is above a given threshold, then the curve can be considered as a line.

With a set of lines identified squares formed by these lines can be identified (Block 423) For example, Hough lines can be contoured, and a polygon approximation process can be applied to find squares in the lines. Any polygon approximation process or algorithm can be utilized. The contours can be approximated into polygons by comparing the contour to a curve with fewer points. If the contour is within a threshold distance of the curve with fewer points, then the contour is considered to be similar to the curve with fewer points. The polygons are filtered by aspect ratio, segments, and area to identify squares that could be macroblocks. In some embodiments, squares that can indicate a macroblock can range from 4 pixel blocks to at least ¼ an area of a frame. In some embodiments, detected squares having area greater than approximately 10 pixels are considered to be a result of macroblocking. A size of a block of pixels that are identified as macroblocks can be configurable from one pixel up to $¼^{th}$ of an area of a frame. The identification of squares can look for a specific pixel block size or a range of pixel block sizes. The macroblocking detection process can be used to detect macroblocking in individual frames of a video stream in real time or in sufficient real time (e.g., within 1-200 ms).

In some embodiments, the macroblocking detection process can be applied to detect macroblocking in every individual frame of the video stream. However, in some other implementations, the method can be applied to detect macroblocking in every second/third/fourth/fifth/ . . . /$n^{th}$ frame of the video stream. In some embodiments, the method can be applied to detect macroblocking in the entire frame of the video stream. However, in some other implementations, the macroblocking detection process can be applied to parts of a frame.

In cases where a complete frame is processed, the number and/or location of the macroblocks can be output to a macroblocking monitor, feedback mechanism, corrective component, or similar component of the video streaming system (Block 425). Where each frame or specified intervals of frames are processed by the macroblocking detector, then the process can determine whether there are additional frames to process (Block 427). Where additional frames exist to process, a next frame in the video stream can be selected for processing (Block 403). The macroblocking detection process can continue until a video stream end. The output of the macroblocking detection process can be provided to a feedback mechanism to notify video sources of the macroblocking, to a corrective component to automatically attempt to smooth or otherwise ameliorate or correct the macroblocking in the frame or video stream, or to otherwise enable the video streaming system to react appropriately to minimize the impact of macroblocking on consumers.

Figure 5:
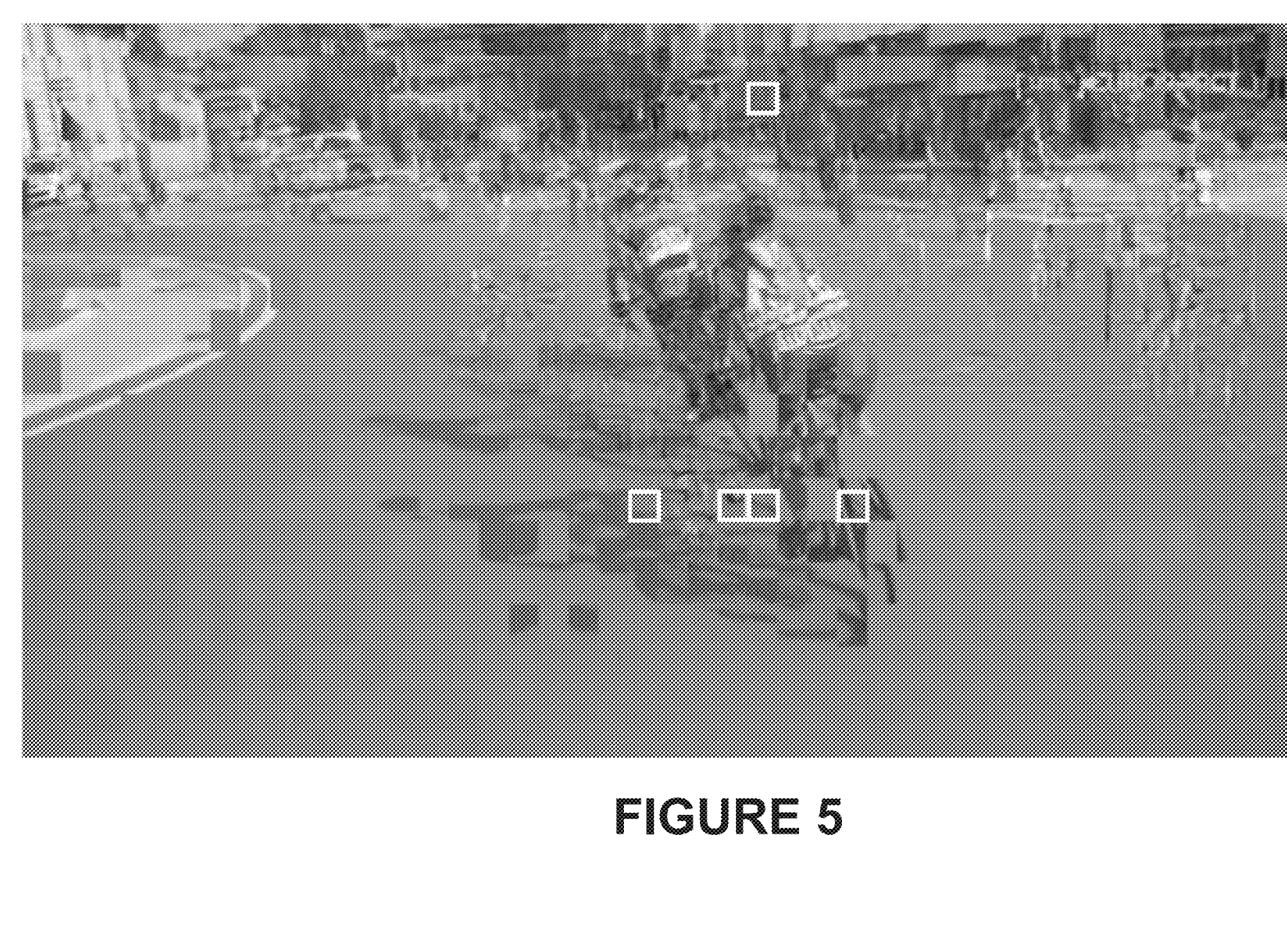
FIG. 5 is a diagram of one example of a frame having a set of macroblocks identified therein.

FIG. 5 is a diagram of an example frame in a video stream where macroblocking detection is applied. In the frame, two bikers are in competing on a road in a city. However, the frame is heavily macroblocked making the contents of the frame difficult to discern. The macroblocking process can start to identify the macroblocks in the frame, however, in some embodiments, rather than identifying all of the macroblocks, a minimum threshold of a number of macroblocks can be detected to identify those frames that are heavily distorted. These frames can be flagged for corrective action or similar response where other frames with fewer macroblocks may not be flagged. The macroblock detection process can thus be configured to identify more, or less corrupted images affected by macroblocking based on the thresholds set or configured.

Electronic Devices Implementing Embodiments of the Invention

Figure 6:
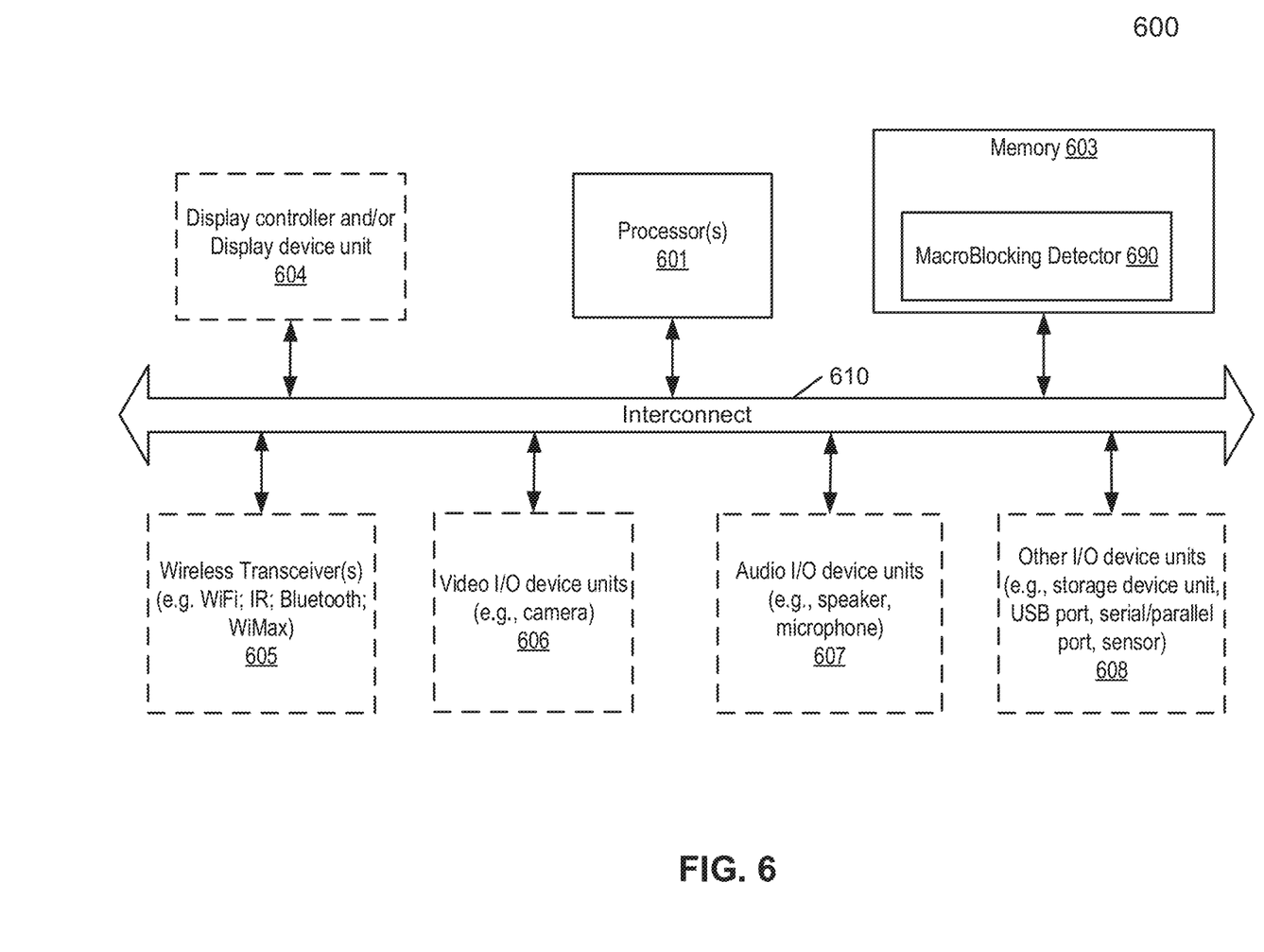
FIG. 6 is a block diagram illustrating an electronic device that may serve as a macroblock detector of a video streaming platform in a cloud computing environment according to one embodiment of the invention.

FIG. 6 is a block diagram illustrating an electronic device that may serve as a macroblocking detector of a video streaming platform in a cloud computing environment according to one embodiment of the invention. The electronic device may be a computing device (e.g., a computer server) of a cloud computing environment). The system 600 may represent the macroblocking detector or monitor described above performing any of the processes or methods for detecting and mitigating macroblocks in a video streaming system described above. The system 600 can include many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the system 600 is intended to show a high level view of many components of the computing system. However, it is to be understood that additional components may be present in certain implementations and furthermore, different arrangement of the components shown may occur in other implementations.

In one embodiment, the system 600 includes a processor 601, memory 603, and optionally device units 604-608 that are interconnected via a bus or an interconnect 610. A processor 601 may represent a single processor or multiple processors with a single processor core or multiple processor cores included therein. The processor 601 may represent one or more general-purpose processors such as a microprocessor, a central processing unit (CPU), or processing device. More particularly, the processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor 601 may communicate with the memory 603, which in an embodiment can be implemented via multiple memory devices to provide for a given amount of system memory. The memory 603 may include one or more volatile storage (or memory) devices such as random access memory (RAM), dynamic RAM (DRAM), synchronous DRAM (SDRAM), static RAM (SRAM), or other types of storage devices. The memory 603 may store information including sequences of instructions that are executed by the processor 601, or any other device units. For example, executable code and/or data of a variety of operating systems, device drivers, firmware (e.g., input output basic system or BIOS), and/or applications can be loaded in the memory 603 and executed by the processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

The memory 603 contains a macroblocking detector 690 or monitor, which may contain instructions to perform the operations of macroblock detection and mitigation as discussed herein above. The macroblocking detector 690 may contain functional blocks as illustrated in the macroblock detector 690 discussed herein above. The processor 601 may instantiate the macroblock detector 690 or monitor to perform operations to detect and mitigate macroblocks as discussed herein above.

The system 600 may optionally further include input/output (I/O) devices such as the device units 604-608, including display control and/or display device unit 604, wireless transceiver(s) 605, video I/O device unit(s) 606, audio I/O device unit(s) 607, and other I/O device units 608 as illustrated. The wireless transceiver 605 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The system 600 may also include an ultrasound device unit (not shown) for transmitting a conference session code.

The video I/O device unit 606 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. An audio I/O device unit 607 may include a speaker and/or a microphone to facilitate voice-enabled functions, such as voice recognition, voice replication, digital recording, and/or telephony functions. Other optional devices 608 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The optional device units 608 may further include certain sensors coupled to the interconnect 610 via a sensor hub (not shown), while other devices such as a keyboard or thermal sensor may be controlled by an embedded controller (not shown), dependent upon the specific configuration or design of the system 600.

The system 600 may be coupled to an orchestrator in an orchestrator as illustrated in FIG. 2. Additionally, the system 600 may be integrated within a streaming platform coordinator 170, similar to the macroblock detector 190 illustrated in FIG. 1. The system 600 may perform methods discussed herein above relating to FIGS. 3A-4.

Note that while the system 600 is illustrated with various components, it is not intended to represent any particular architecture or manner of interconnecting the components; as such details are not germane to embodiments of the present invention. It will also be appreciated that an electronic device having fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

It is to be noted that the operations of the flow diagrams are described with reference to the exemplary embodiment electronic devices. However, it should be understood that the operations of flow diagrams can be performed by embodiments of the invention other than those discussed with reference to the electronic devices, and the embodiments discussed with reference to the electronic devices can perform operations different than those discussed with reference to the flow diagrams.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims.

What is claimed is:

1. A method executed by an electronic device in a video streaming system including a macroblock detector, the method comprising:
   receiving a video stream from a video source;
   selecting a frame from the video stream;
   detecting edges in the frame of the video stream;
   generating straight lines from detected edges in the frame of the video stream;
   identifying a set of squares formed by the straight lines in the frame with polygon approximation; and
   outputting an indication of a detected macroblock in the frame in response to identifying at least one square with characteristics of a macroblock from the set of squares in the frame.

2. The method of claim 1, further comprising:
   pre-processing the frame by increasing brightness of pixels in the frame, increasing contrast of pixels in the frame, or converting pixels of the frame to greyscale.

3. The method of claim 1, wherein detecting edges in the frame further comprising:
   filtering noise from the frame using a gaussian filter; and
   determining intensity gradient or color changes in the frame.

4. The method of claim 1, wherein detecting edges in the frame further comprising:
   removing spurious edge pixels from frame using non-maximum suppression;
   identifying edge pixels using a double threshold; and
   defining edge pixels based on adjacency between edge pixels.

5. The method of claim 1, wherein outputting the indication further comprising:
   outputting a number of macroblocks detected in the frame.

6. The method of claim 1, wherein outputting the indication further comprising:
   notifying a feedback mechanism or a corrective component of the video streaming system.

7. The method of claim 6, wherein notifying the feedback mechanism or the corrective component is response to a number of macroblocks in a frame exceeding a threshold value.

8. An electronic device to serve as a macroblock detector in a video streaming platform, the electronic device comprising:
   a non-transitory machine-readable storage medium having stored therein a macroblock detector; and
   a processor coupled to the non-transitory machine-readable storage medium, the processor to execute the macroblock detector, the macroblock detector to receive a video stream from a video source, to select a frame from the video stream, to detect edges in the frame of the video stream, to generate straight lines from detected edges in the frame of the video stream, to identify a set of squares formed by the straight lines in the frame with polygon approximation, and to output an indication of a detected macroblock in the frame in response to identifying at least one square with characteristics of a macroblock from the set of squares in the frame.

9. The electronic device of claim 8, wherein the macroblock detector is further to pre-process the frame by increasing brightness of pixels in the frame, increasing contrast of pixels in the frame, or converting pixels of the frame to greyscale.

10. The electronic device of claim 8, wherein detecting edges in the frame further includes filtering noise from the frame using a gaussian filter, and determining intensity gradient or color changes in the frame.

11. The electronic device of claim 8, wherein detecting edges in the frame further includes removing spurious edge pixels from frame using non-maximum suppression, identifying edge pixels using a double threshold, and defining edge pixels based on adjacency between edge pixels.

12. The electronic device of claim 8, wherein outputting the indication further includes outputting a number of macroblocks detected in the frame.

13. The electronic device of claim 8, wherein outputting the indication further includes notifying a feedback mechanism or a corrective component of the video streaming platform.

14. The electronic device of claim 13, wherein notifying the feedback mechanism or the corrective component is response to a number of macroblocks in a frame exceeding a threshold value.

15. A non-transitory machine-readable storage medium having instructions stored therein, which when executed by a processor, cause the processor to perform operations in an electronic device providing macroblock detection in a video streaming platform, the operations comprising:
   receiving a video stream from a video source;
   selecting a frame from the video stream;
   detecting edges in the frame of the video stream;
   generating straight lines from detected edges in the frame of the video stream;

identifying a set of squares formed by the straight lines in the frame with polygon approximation; and outputting an indication of a detected macroblock in the frame in response to identifying at least one square with characteristics of a macroblock from the set of squares in the frame.

16. The non-transitory machine-readable storage medium of claim 15, wherein operations further comprises:

pre-processing the frame by increasing brightness of pixels in the frame, increasing contrast of pixels in the frame, or converting pixels of the frame to greyscale.

17. The non-transitory machine-readable storage medium of claim 15, wherein detecting edges in the frame further comprises:

filtering noise from the frame using a gaussian filter; and determining intensity gradient or color changes in the frame.

18. The non-transitory machine-readable storage medium of claim 15, wherein detecting edges in the frame further comprises;

removing spurious edge pixels from frame using non-maximum suppression;

identifying edge pixels using a double threshold; and defining edge pixels based on adjacency between edge pixels.

19. The non-transitory machine-readable storage medium of claim 15, wherein outputting the indication further comprises:

outputting a number of macroblocks detected in the frame.

20. The non-transitory machine-readable storage medium of claim 15, wherein outputting the indication further comprises:

notifying a feedback mechanism or a corrective component of the video streaming platform.

\* \* \* \* \*